2,910,499

PRODUCTION OF BICYCLO HETEROCYCLIC PHOSPHORUS COMPOUNDS

William M. Lanham, Charleston, W. Va., assignor to Union Carbide Corporation, a corporation of New York No Drawing. Application October 6, 1955
Serial No. 539,030

12 Claims. (Cl. 260—461)

This invention relates to the production of a novel class of bicyclo heterocyclic phosphorus compounds having structures corresponding to the formula:

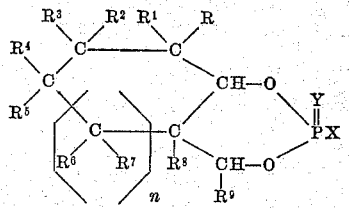

wherein each R and $R^1$ to $R^9$, respectively, designates a member of the class consisting of hydrogen and the alkyl radicals having 1 to 20 carbon atoms, and preferably R is hydrogen, $R^2$, $R^3$, $R^5$, $R^6$, $R^7$ and $R^8$, respectively, is hydrogen or a methyl radical, and $R^1$, $R^4$, and $R^9$, respectively, is hydrogen or an alkyl radical having from 1 to 20 carbon atoms; X is a radical of the class consisting of chlorine, bromine, fluorine, and mercapto radicals; Y is a radical of the class consisting of oxygen and sulfur; and $n$ is of the class consisting of 0 and 1.

The aforesaid compounds wherein X represents a halogen such as chlorine or bromine can be prepared by reacting a phosphoryl halide or a thiophosphoryl halide with a 2-(1-hydroxyalkyl)cycloalkanol, such as the 2-(1-hydroxyalkyl)cyclohexanols and cyclopentanols, and the corresponding 2-(1-hydroxyalkyl)cycloalkanols substituted on at least one carbon atom of the cycloalkanol ring with at least one alkyl radical having 1 to 20 carbon atoms.

The novel compounds wherein X represents a halogen and Y represents oxygen or sulfur are excellent insecticides, that produced in Example 5, infra, being a highly potent insecticide. It is a very effective poison bait for flies. Moreover, these compounds readily react with amines, ammonia, alcohols and the alkali metal salts of alcohols, thiophenols, mercaptans, and phenols to give neutral compounds having utility as plasticizers for various vinyl resins and other synthetic resins, as pesticides, and as oil additives.

The novel compounds of the invention wherein X represents a mercapto group and Y represents sulfur can be prepared conveniently by reacting phosphorus pentasulfide with one of the aforesaid 2-(1-hydroxyalkyl)cycloalkanols. These novel compounds have been found to be biologically active compounds, with high insecticidal efficiency. Moreover, they are important intermediates for producing highly potent insecticides by reacting them with chlorine in the molar ratio of 2:3, as illustrated below:

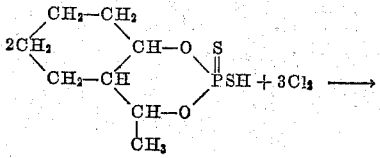

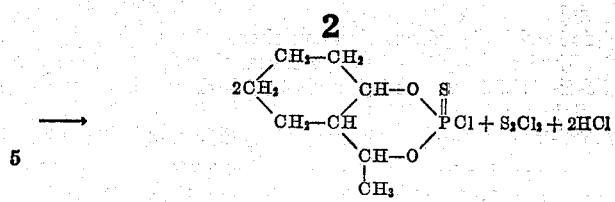

The disecondary 2-(1-hydroxyalkyl)cycloalkanols used as starting materials in the process of the invention can be made readily by reacting acid anhydrides, acid chlorides, enol esters of ketones, ketene, or a ketene homologue, CHR:C:O, where R is hydrogen or an alkyl or monocyclic aryl hydrocarbon group, with cyclopentanone, cyclohexanone, or a ring carbon alkyl-substituted cyclopentanone or cyclohexanone having an alpha-hydrogen atom, followed by rearrangement and subsequent hydrogenation of the resulting diketone at 100°–125° C. in the presence of a Raney nickel catalyst. Where the ketone is symmetrical only one product is obtained. If the ketone is unsymmetrical and contains an alpha-hydrogen atom on each side of the carbonyl group, two isomers are secured. When there is only one alpha-hydrogen atom only one product is secured even in the case of an unsymmetrical ketone. The 2-(1-hydoxyalkyl)-cycloalkanols useful in the process have structures corresponding to the formula:

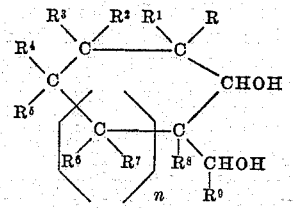

wherein R, $R^1$ to $R^9$ and $n$ have the meanings hereinbefore recited. Methods for making 2-(1-hydroxyalkyl)-cycloalkanols useful as starting materials in the process are described in Compt. rend., 207, 429–430; Compt. rend., 207, 475–477 (1938); and Chem. Abstracts, 33, 148 (1939). Still another method is described in U.S. Patent No. 2,356,683.

Among 2-(1-hydroxyalkyl)cycloalkanols useful as starting materials in the process of this invention may be mentioned:

2-hydroxymethylcyclohexanol
2-hydroxymethylcyclopentanol
2-(1-hydroxyethyl)cyclopentanol
2-(1-hydroxyethyl)-3-methylcyclopentanol
2-(1-hydroxypropyl)cyclopentanol
2-(1-hydroxypropyl)cyclohexanol
2-(1-hydroxyisobutyl)cyclohexanol
2-(1-hydroxyoctadecyl)cyclohexanol
2-(1-hydroxyethyl)-3,5,5-trimethylcyclohexanol
2-(1-hydroxyethyl)-3,3,5-trimethylcyclohexanol
2-(1-hydroxypropyl)-3,5,5-trimethylcyclohexanol
2-(1-hydroxypropyl)-3,3,5-trimethylcyclohexanol
2-(1-hydroxyisobutyl)-3,5,5-trimethylcyclohexanol
2-(1-hydroxyisobutyl)-3,3,5-trimethylcyclohexanol
2-(1-hydroxyoctadecyl)-3,5,5-trimethylcyclohexanol
2-(1-hydroxyoctadecyl)-3,3,5-trimethylcyclohexanol
2-(1-hydroxyethyl)-6-methylcyclohexanol
2-(1-hydroxyethyl)-2-methylcyclohexanol
2-(1-hydroxypropyl)-5-methylcyclohexanol
2-(1-hydroxypropyl)-3-methylcyclohexanol
2-(1-hydroxyisobutyl)-4-methylcyclohexanol
3,6-dimethyl-2-(1-hydroxyoctadecyl)cyclohexanol
2,5-dimethyl-2-(1-hydroxyoctadecyl)cyclohexanol
4-tert-butyl-2-(1-hydroxyethyl)cyclohexanol
2-(1-hydroxyhexyl)cyclohexanol
2-(1-hydroxybutyl)cyclohexanol
2-(2-ethyl-1-hydroxybutyl)cyclohexanol 2-(2-ethyl-1-hydroxyhexyl)cyclohexanol
4-(1-ethyl-1-methylamyl)-2-(1-hydroxyethyl)cyclohexanol
4-dodecyl-2-(1-hydroxyethyl)cyclohexanol
2-(1-hydroxyethyl)-4-nonylcyclohexanol
4,6-di-(1,1,3,3-tetramethylbutyl)-2-(1-hydroxyethyl)cyclohexanol
4,6-di-tert-butyl-2-(1-hydroxyethyl)cyclohexanol The reaction between the phosphoryl halide and the di-secondary 2-(1-hydroxyalkyl)cycloalkanol (a 1,3-diol) proceeds smoothly with the production of excellent yields of the desired bicyclo-2-halo-2-oxo-1,3,2-dioxaphosphorinanes. It often is convenient to add the phosphoryl halide slowly to an agitated suspension or solution of the diol in an inert solvent for the desired product. If desired the 1,3-diol, or a solution thereof in an inert solvent, can be added in successive small increments to the phosphoryl halide, or to a solution thereof in an inert solvent. Where the desired product is a liquid, no solvent is necessary. When used, any substantially water-free inert solvent can be employed, such as benzene, toluene, the xylenes, ethylene dichloride, heptane, hexane, ethyl ether, butyl ether and the like.

The reaction preferably is conducted at temperatures around 25° C. under 500 mm. of mercury pressure. However, temperatures from about −20° C. to about +60° C. can be used, and the reaction can be conducted at atmospheric pressure or higher, in which case the pressure subsequently is released to facilitate the removal of the by-product hydrogen halide. Equimolar quantities of the reactants enter into the reaction, and these are desirable proportions to use. However, an excess of either reactant can be employed although a considerable excess of the diol can present a separation problem. The novel products can be purified by vacuum distillation or by crystallization. However, this usually is not necessary.

It is sometimes preferred to conduct the reaction of the phosphoryl halide and the 2-(1-hydroxyalkyl)cycloalkanol in the presence of a hydrogen chloride sequestering agent, such as the tertiary amines, e.g., pyridine, N,N-dimethylaniline, trimethylamine, tributylamine and the like. However, this modification of the process usually is not necessary and the reaction may be conducted at atmospheric or subatmospheric pressures.

In making the novel thiono-halides of the invention it is customary to add the said diol dropwise to an equimolar quantity of thiophosphoryl halide dissolved in benzene containing the theoretical two mols of a tertiary amine such as pyridine for each mole of the diol. If desired the thiophosphoryl halide can be added to the diol dissolved in benzene containing the tertiary amine. An excess of either the diol or thiophosphoryl halide can be used. While reaction temperatures within the range from 25° to around 60° C. can be used, a temperature around 40° C. is preferred since at this convenient temperature the exothermic reaction proceeds smoothly and rapidly. It has been found that in order to remove completely the last traces of by-product amine hydrochloride from the reaction mixture a water wash is required. A substantially pure residue product can be prepared by this process. If desired, the residue product can be distilled under high vacuum for further purification, using a falling film type vacuum still.

In the production of those novel compounds of the invention wherein X represents a mercapto group and Y represents sulfur it is customary to add the diol to an agitated suspension of phosphorus pentasulfide in an inert diluent such as ethylene dichloride, an aliphatic hydrocarbon such as heptane, or an aromatic hydrocarbon such as benzene, toluene, and the xylenes.

The reaction proceeds smoothly with a copious evolution of gas at reaction temperatures around 50° to 70° C., although temperatures within the range from 10° C. to around 125° C. are operative. At substantially higher temperatures condensation reactions favoring the production of compounds of the type $$\begin{array}{c}S\phantom{xxxx}S\\\|\phantom{xxxx}\|\\>P-S-P<\end{array}$$

tend to increase unduly.

While the phosphorus pentasulfide and diol preferably are employed in stoichiometric proportions, a substantial excess of either reactant can be used, for example, the phosphorus compound and diol can be used in the molar ratio range between 0.25 to 1 and 1 to 1.

Preferably the diol is added in small successive portions to an agitated suspension of phosphorus pentasulfide in an inert diluent, such as ethylene dichloride, or a benzenoid hydrocarbon. Since the diols usually are liquids the use of a diluent is not critical. If desired the phosphorus compound can be added slowly to the diol.

The reaction preferably is completed by heating the reaction mixture for several hours at the elevated reaction temperature after addition of the one reactant to the other has been completed. When gas evolution ceases and the reaction mixture becomes homogeneous the reaction is complete.

No special purification steps are usually necessary— the diluent, when used, being removed from the reaction mixture by fractional distillation. However, the residue product may be purified by preparing an aqueous solution of the alkali metal salt thereof by treatment with an aqueous solution of an alkali metal hydroxide or carbonate, filtering this solution or extracting it from the diluent, and then adding a mineral acid such as hydrochloric acid to the filtrate or to the extract to regenerate the purified residue product of the invention.

The compounds of the invention wherein X is fluorine can be prepared by reacting an alkali metal fluoride or ammonium fluoride with a compound of the structure

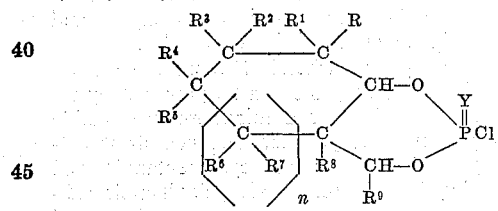

wherein R and $R^1$ to $R^9$, Y and $n$, respectively, have the meanings hereinbefore designated, at temperatures within the range from around 25° C. to around 200° C., and preferably from around 50° C. to around 70° C., desirably in the presence of an inert solvent for the phosphorus-containing reactant and the desired products. Among solvents suitable for use in the process are benzene, toluene, the xylenes, carbon tetrachloride, ethylene dichloride, heptane, and hexane. Dimethylformamide is the preferred solvent. Although it is preferred that the fluoride reactant be subsantially anhydrous, the hydrated salts can be used. The process involves the reaction of equimolar quantities of the phosphorus-containing reactant and the alkali metal fluoride or ammonium fluoride. However an excess of the fluoride is preferred. Usually a 100% excess is employed, although a slight excess (5% to 10% mol) is sufficient. The resultant bicyclo heterocyclic phosphoryl fluorides are highly resisttant to uncatalyzed hydrolysis, as shown in the examples illustrating methods for their recovery from the reaction mixtures.

The following examples serve to illustrate the invention:

*Example 1*

To an agitated solution of 169 grams (1 mol) of thiophosphoryl chloride, 158 grams (2 mols) of pyridine and 1000 cc. of benzene, there were added dropwise during 27 minutes 144 grams (1 mol) of 2-(1-hydroxyethyl)-3-methyl-cyclopentanol. During this time and for 2 hours afterward the reaction mixture was held at 40° C., and then for 16 hours at 25° C. It was then filtered, the filtrate washed with cold (5° C.) water, dried over calcium sulfate, filtered, and stripped by distillation to a kettle temperature of 50° C. and under less than 2 mm. of mercury pressure. The resultant P-chloro-5,7-dimethyl - 2,4 - dioxa - P - thiono - 3 - phosphabicyclo[4.3.0]-nonane was recovered as a brown liquid residue of the following formula, having the properties: percent purity (by esterification)=100%; $n_D^{30}$=1.5233; analysis, percent by weight: percent P=13.07 (theory=12.88); percent S=13.3 (theory=13.32); percent Cl=14.03 (theory=14.73); percent C=40.40 (theory=39.96); percent H=6.09 (theory=5.86).

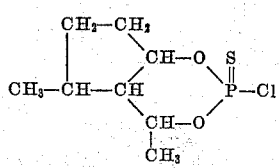

*Example 2*

To an agitated suspension of 55.5 grams (0.25 mol) of phosphorus pentasulfide in 200 cc. of toluene maintained at 70° C. there were added dropwise during 20 minutes 65 grams (0.5 mol) of 2-(1-hydroxyethyl)cyclopentanol. After maintaining the mixture at 70° C. for 2 additional hours the reaction mixture was homogeneous, and hydrogen sulfide evolution had ceased. After standing at 25° C. for about 64 hours the reaction mixture was filtered, and the filtrate was stripped by distillation to a kettle temperature of 100° C. under less than 2 mm. of mercury. There was thus obtained 110 grams (theory =112 grams) of 2,4-dioxa-P-mercapto-5-methyl-P-thiono-3-phosphabicyclo[4.3.0]nonane in the form of a black, slightly viscous residue having the following structure and properties: $n_D^{30}$=1.5703; analysis, percent by weight: percent P=13.80; percent S=26.6; percent C=38.59; percent H=5.88.

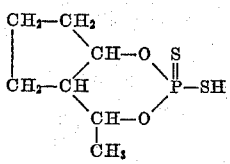

*Example 3*

To an agitated solution of 169 grams (1 mol) of thiophosphoryl chloride, 158 grams (2 mols) of pyridine, and 850 cc. of benzene held at 40° C. there were added during 18 minutes a solution of 186 grams (1 mol) of 2 - (1 - hydroxyethyl) - 3,3,5 - trimethylcyclohexanol and/or 2 - (1 - hydroxyethyl) - 3,5,5 - trimethylcyclohexanol in 150 cc. of benzene. After standing an additional 5 hours at 40° C. the reaction mixture was held at 25° C. overnight, was filtered, and the filtrate was washed with 500 cc. of distilled water at 25° C., dried over calcium sulfate, and stripped by distillation to a kettle temperature of 50° C. under less than 1.5 mm. of mercury. The residual P - chloro - 2,4 - dioxa - 5,7,7,9 - tetramethyl - P-thiono - 3 - phosphabicyclo[4.4.0]decane and/or P-chloro - 2,4 - dioxa - 5,7,9,9 - tetramethyl - P - thiono - 3-phosphabicyclo[4.4.0]decane was recovered as a yellow liquid residue which after filtering had the following properties and structure: percent purity (by esterification) =94.6; $n_D^{30}$=1.5194; analysis, percent by weight; percent P=10.58 (theory=10.96); percent S=10.9 (theory =11.34); percent Cl=12.51 (theory=12.54); percent C=47.22 (theory=46.74); percent H=6.97 (theory =7.13); percent yield=95.

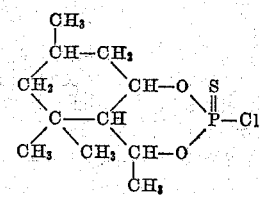

and/or its isomer

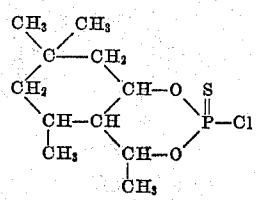

*Example 4*

2,4 - dioxa - P - mercapto - 5,7,7,9 - tetramethyl - P-thiono - 3 - phosphabicyclo[4.4.0]dceane and/or 2,4-dioxa - P - mercapto - 5,7,9,9 - tetramethyl - P - thiono-3-phosphabicyclo[4.4.0]decane was prepared by the dropwise addition of 93 grams (0.5 mol) of 2-(1-hydroxyethyl) - 3,3,5 - trimethylcyclohexanol and/or 2 - (1 - hydroxyethyl)-3,5,5-trimethylcyclohexanol in 50 cc. of toluene to an agitated suspension of 55.5 grams (0.25 mol) of phosphorus pentasulfide in 200 cc. of toluene. There was no apparent heat of reaction during the addition, which required 19 minutes, and it was necessary to heat the reaction mixture in order to maintain the kettle temperature at 70° C. After the addition the reaction mixture was maintained at 70° C. for 7 additional hours, at which time the evolution of hydrogen sulfide ceased. The reaction mixture was allowed to stand overnight at 25° C., heated to 70° C., and filtered while hot. The filtrate was stripped by distillation at 100° C. under less than 1.5 mm. of mercury. There was thus obtained 135 grams of the desired compound as a brown, viscous residue which had the following properties: $n_D^{30}$=1.5493; analysis, percent by weight: percent P=11.09; percent S=20.90; percent C=47.51; percent H=7.51; percent yield=96.

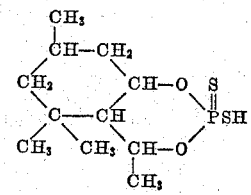

and/or its isomer

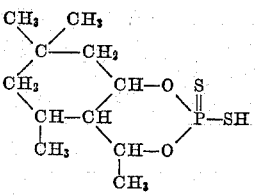

*Example 5*

To an agitated solution consisting of 424 grams (2.5 mols) of thiophosphoryl chloride, 395 grams (5 mols) of pyridine and 2500 cc. of benzene maintained at 40° C., there were added dropwise during 40 minutes 361 grams (2.5 mols) of 2-(1-hydroxyethyl)cyclohexanol. The reaction mixture was heated an additional 3 hours at 40° C., cooled to 10° C. and filtered. The filtrate was washed with concentrated aqueous sodium bicarbonate until it was basic toward litmus and separated into two layers. The upper oil layer was separated, dried over calcium sulfate and filtered. The resultant filtrate was stripped by vacuum distillation to a kettle temperature of 50° C. under a pressure of less than 2 mm. of mercury, yielding a yellow fluid residue product which was further purified by vacuum distillation (using a falling film type still at a kettle temperature of 78° C. under less than 0.2 mm. of mercury), yielding P-chloro-2,4-dioxa-5-methyl-P-thiono-3-phosphabicyclo[4.4.0]decane in the form of a colorless liquid distillate having the following properties: percent purity (by esterification)=99.2; $n_D^{30}$=1.5341; percent yield=67, based upon the phosphorus-containing reactant.

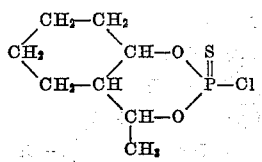

Example 6

To an agitated suspension of 55.5 grams (0.25 mol) of phosphorus pentasulfide in 200 cc. of toluene maintained at 70° C. there were added dropwise during 20 minutes 72 grams (0.5 mol) of 2-(1-hydroxyethyl)cyclohexanol. After maintaining the reaction mixture at 70° C. for an additional 4 hours the evolution of hydrogen sulfide ceased and the reaction mixture was filtered. The filtrate was stripped by pot distillation to a kettle temperature of 100° C. under less than 1.5 mm. of mercury, yielding 115 grams of 2,4-dioxa-P-mercapto-5-methyl-P-thiono-3-phosphabicyclo[4.4.0]decane in the form of a brown liquid residue having the following structure and properties: percent purity (by acidity determination) =95.0; $n_D^{30}$=1.5741; analysis, percent by weight: percent P=13.24 (theory=13.00); percent S=25.80 (theory =26.90); percent C=40.69 (theory=40.33); percent H =6.64 (theory=6.34).

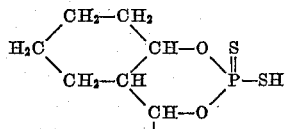

Example 7

To 153 grams (1 mol) of phosphoryl chloride maintained at a reaction temperature of 25° C. under an absolute pressure of 500 mm. of mercury there were added during 35 minutes 144 grams (1 mol) of 2-(1-hydroxyethyl)cyclohexanol. Thereafter the reaction mixture was maintained at 25° C. under the said pressure for an additional hour, then at 25° C. under 350 mm. of mercury for 1 hour, and finally at 25° C. under less than 1 mm. of mercury for 2.5 hours. The resultant P-chloro-2,4-dioxa-5-methyl - P - oxo - 3 - phosphabicyclo[4.4.0] decane was secured in the form of a light orange liquid residue having the following properties: equivalent weight (by esterification)=218.7 (theory=224.6); $n_D^{30}$ =1.4883. It had the following analysis:

|  | Observed | Theory |
| --- | --- | --- |
| Percent Cl | 15.36 | 15.78 |
| Percent P | 13.68 | 13.80 |
| Percent C | 43.11 | 42.80 |
| Percent H | 6.53 | 6.28 |

This compound has the following structure:

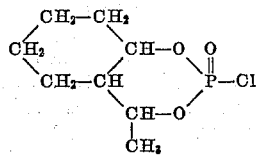

Example 8

To 153 grams (1 mol) of phosphoryl chloride held at 25° C. under 500 mm. pressure there were added dropwise during 20 minutes 130 grams (1 mol) of 2-(1-hydroxyethyl) cyclopentanol with cooling to maintain a kettle temperature of 25° C. After the reaction mixture was maintained for an additional hour at the said pressure and temperature, the pressure was reduced to 350 mm. during one hour and finally was reduced to less than 2 mm. of mercury at 25° C. during 3 hours. The residual P-chloro-2,4-dioxa-P-oxo-5-methyl - 3 - phosphabicyclo[4.3.0]nonane was recovered as a brown liquid residue having the following properties: equivalent weight (by saponification) = 102.9 (theory = 105.3); $n_D^{30}$ =1.4800; analysis in percent by weight: percent P=14.46 (theory=14.71); percent C=41.04 (theory=39.95); percent H=6.47 (theory=5.74).

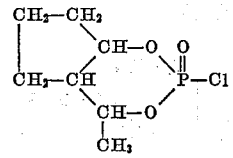

Example 9

To an agitated solution of 186 grams (1 mol) of 2-(1-hydroxyethyl)-3,3,5-trimethylcyclohexanol and/or 2-(1-hydroxyethyl)-3,5,5-trimethylcyclohexanol in 150 grams of benzene maintained at 25° C. under 500 mm. of mercury pressure there were added during 18 minutes dropwise 153 grams (1 mol) of phosphoryl chloride with cooling of the reaction mixture. After maintaining the latter at the said temperature and pressure for one hour and then for one hour at the said temperature under 350 mm. of mercury, then for one hour at 25° C. under less than 4 mm. of mercury, and finally at 50° C. for 0.5 hour under less than 1.5 mm. of mercury, there were obtained 261.5 grams (theory=266.7 grams) of P-chloro-2,4-dioxa-P-oxo-5,7,7,9-tetramethyl - 3 - phosphabicyclo [4.4.0]decane and/or P-chloro-2-4-dioxa-P-oxo-5,7,9,9-tetramethyl-3-phosphabicyclo[4.4.0]decane as a brown fluid residue having the following properties: percent purity (by saponification)=99.4; $n_D^{30}$=1.4819; analysis, percent by weight: percent P=11.03 (theory=11.62); percent C=49.40 (theory=49.55); percent H=7.76 (theory=7.56).

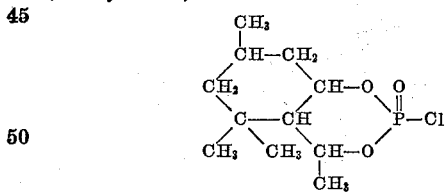

and/or

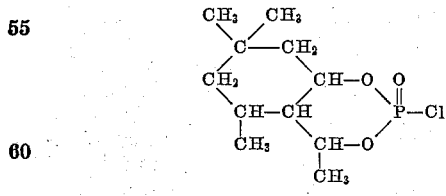

The diol employed in this example and Examples 3 and 4 was obtained by the reaction of isopropenyl acetate and 3,3,5-trimethylcyclohexanone, followed by rearrangement of the resulting enol acetate, and subsequent hydrogenation of the product. Since two isomers are possible, both the diol and the phosphorus derivatives are given the appropriate two names.

Example 10

During 27 minutes 144 grams (1 mol) of 2-(1-hydroxyethyl)-3-methylcyclopentanol were added dropwise to 153 grams (1 mol) of phosphoryl chloride with agitation while maintaining the reaction mixture at 25° C. under 500 mm. pressure throughout the addition and for an additional hour, then at 25° C. under 350 mm. pressure for one hour, and finally at that temperature under 2 mm. of mercury for 24 hours. There was thus obtained 222.5 grams (theory=224.6 grams) of P-chloro-5,7 - dimethyl - 2,4 - dioxa - P - oxo - 3 - phosphabicyclo [4.3.0]nonane in the form of a red liquid residue having the following properties: equivalent weight (by esterification)=215.1 (theory=224.6); $n_D^{30}$=1.4768; analysis, percent by weight: percent P=13.84 (theory= 13.79); percent C=43.18 (theory=42.81); percent Cl= 16.17 (theory=15.78); percent H=6.68 (theory=6.28).

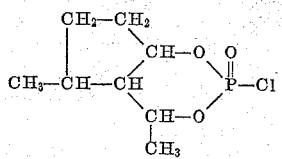

*Example 11*

To an agitated suspension of 37 grams (1 mol) of ammonium fluoride in 500 cc. of dimethylformamide maintained at 50° C., there were added dropwise during 30 minutes 112 grams (0.5 mol) of P-chloro-2,4-dioxa-5-methyl-P-oxo-3-phosphabicyclo[4.4.0]decane. The reaction then was heated at 70° C. for 4 hours, allowed to stand overnight at 25° C., and filtered. The filtrate was stripped by distillation to a kettle temperature of 60° C. under 1 mm. of mercury. The resultant light brown residue was dissolved in 200 cc. of ethyl ether, washed with 300 cc. of water, dried over calcium sulfate, filtered, and the filtrate stripped by distillation to a kettle temperature of 50° C. under 1 mm. of mercury. The resultant 2,4-dioxa-P-fluoro-5-methyl-P-oxo-3-phosphabicyclo[4.4.0]decane was recovered in the form of 62 grams of light brown liquid residue which was purified by distillation at 78° C. under 0.2 mm. of mercury using a falling film type still. There thus was obtained the purified product in the form of a clear, colorless distillate having the following properties: percent purity (by esterification)=97.6; salt content= 0.005 cc. of N HClO$_4$/g.; $n_D^{30}$=1.4577. It had the following analysis, in percent by weight: percent P=14.79 (theory=14.88); percent F=9.17 (theory=9.12); percent C=46.05 (theory=46.17); percent H=6.66 (theory=6.77); percent Cl=nil; percent yield=44 (based upon the phosphorus-containing reactant).

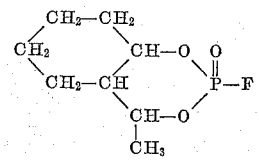

*Example 12*

To an agitated suspension of 37 grams (1 mol) of ammonium fluoride in 400 cc. of dimethylformamide held at 50° C. there were added dropwise during 20 minutes 119 grams (0.5 mol) of P-chloro-5,7(8)-dimethyl - 2,4 - dioxa - P - oxo - 3 - phosphabicyclo[4.4.0] decane. The reaction mixture then was heated for 12 hours at 70° C., filtered at 25° C., and the filtrate stripped by distillation to a kettle temperature of 70° C. under 2 mm. of mercury. The resultant dark brown liquid residue was dissolved in 250 cc. of ethyl ether, washed with 450 cc. of ice water, dried over calcium sulfate, and stripped by distillation to a kettle temperature of 70° C. under 2 mm. of mercury. A 60 gram portion of the resultant liquid residue was further purified by distillation at 78° C. under 0.2 mm. of mercury using a falling film type still yielding 5,7(8)-dimethyl-2,4-dioxa-P-fluoro-P-oxo-3-phosphabicyclo[4.4.0]decane in the form of a light yellow slightly viscous liquid distillate having the following properties: percent purity (by saponification)=98.3; salt=0.003 cc. of N HClO$_4$/g.; and the following analysis, in percent by weight: percent P=13.82 (theory=13.86); percent F=8.50 (theory=8.55); percent C=49.09 (theory=48.62); percent H=7.24 (theory=7.25); percent Cl=nil; percent yield=53 (based upon the phosphorus-containing reactant).

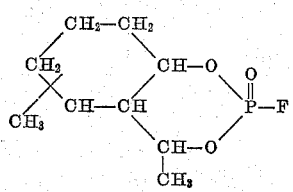

*Example 13*

To an agitated suspension of 56 grams (1.5 mol) of ammonium fluoride in 600 cc. of dimethylformamide held at 70° C., there were added dropwise during 15 minutes 153 grams (0.75 mol) of P-chloro-2,4-dioxa-5-methyl-P-oxo-3-phosphabicyclo[4.3.0]nonane. The reaction mixture was held at 70° C. for an additional 16 hours, and filtered at 25° C. The filtrate was stripped by distillation to a kettle temperature of 70° C. under 2 mm. of mercury. The resultant liquid residue was dissolved in 250 cc. of ethyl ether, washed with 600 cc. of ice water, dried over calcium sulfate, filtered, and stripped by distillation at 70° C. under 2 mm. of mercury after which the dark brown liquid residue was further purified by distillation at 78° C. under 0.2 mm. of mercury using a falling film type still yielding 2,4-dioxa - P - fluoro - 5 - methyl - P - oxo - 3 - phosphabicyclo[4.3.0]nonane as a brown fluid distillate having the following properties: percent purity (by saponification)=95.3; salt=0.005 cc. of N HClO$_4$/g.; and had the following analysis, in percent by weight: percent P= 15.04 (theory=15.94); percent F=9.30 (theory=9.78); percent C=44.50 (theory=43.31); percent H=6.49 (theory=6.23); percent Cl=nil.

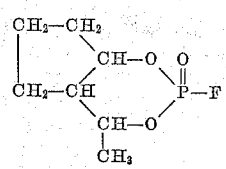

*Example 14*

A mixture of 120 grams (0.5 mol) of P-chloro-2,4-dioxa - 5 - methyl - P - thiono - 3 - phosphabicyclo [4.4.0]decane, 37 grams (1 mol) of ammonium fluoride, and 500 cc. of dimethylformamide was heated for 4 hours at 70° C. and after standing overnight at 25° C. was filtered and the filtrate stripped by distillation to a kettle temperature of 60° C. under 1 mm. of mercury yielding as a still residue 131 grams of a light brown liquid which was dissolved in 200 cc. of ethyl ether, washed with 300 cc. of water, dried over calcium sulfate, filtered, and the filtrate stripped by distillation to a kettle temperature of 50° C. under 1 mm. of mercury. The resultant 2,4-dioxa-P - fluoro - 5 - methyl - P - thiono - 3 - phosphabicyclo [4.4.0]decane was a light yellow slightly viscous liquid having the following properties: percent purity (by esterification)=97.7; $n_D^{30}$=1.5048; analysis, percent by weight: P=13.78 (theory=13.81); S=14.70 (theory= 14.28); C=42.87 (theory=42.83); H=6.23 (theory= 6.29); percent yield (based on the phosphorus-containing reactant)=69.

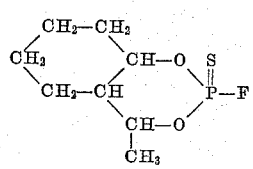

*Example 15*

To 61 grams (0.4 mol) of phosphoryl chloride held at

25° C. under 500 mm. of mercury pressure, there was slowly added during 20 minutes a solution consisting of 91 grams (0.4 mol) of 2-(2-ethyl-1-hydroxyhexyl)cyclohexanol and 25 cc. of benzene with agitation. After another hour under these conditions the pressure was reduced to 350 mm. of mercury for one hour and then to less than 2 mm. of mercury for 2 hours at this temperature, and finally at 50° C. under less than 3 mm. of mercury for 0.5 hour. A portion of the still residue was further stripped at 50° C. under less than 2 mm. of mercury for 1.5 hours yielding P-chloro-2,4-dioxa-5-(1-ethylamyl)-P-oxo-3-phosphabicyclo[4.4.0]decane as a brown viscous liquid having the following properties: $n_D^{30}=1.4898$; analysis, percent by weight: P=9.16 (theory=10.04); C=55.06 (theory=54.50); H=8.25 (theory=8.50); percent yield (based on the phosphorus-containing reactant)=98.

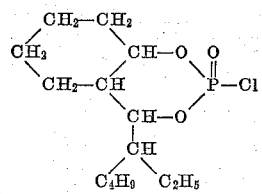

Example 16

During 12 minutes 91 grams (0.4 mol) of 2-(2-ethyl-1-hydroxyhexyl)cyclohexanol and 50 cc. of benzene were added with agitation to a solution consisting of 68 grams (0.4 mol) of thiophosphoryl chloride, 64 grams (0.8 mol) of pyridine, and 350 cc. of benzene while maintaining the reaction mixture at 40° C. and for an additional 1.75 hours. After standing overnight at 25° C., the reaction mixture was filtered, and the filtrate was washed with 600 cc. of 5° C. water, dried over calcium sulfate, filtered, and the filtrate was stripped by distillation to a kettle temperature of 50° C. under less than 2 mm. of mercury pressure. There thus was obtained 112 grams of P-chloro-2,4-dioxa-5-(1-ethylamyl)-P-thiono-3-phosphabicyclo[4.4.0]decane as a pale green liquid having the following properties: $n_D^{30}=1.5200$; salt=0.005 cc. of N HClO$_4$/g.; and the following analysis in percent by weight: P=9.18; S=9.59; C=51.26; H=7.77; percent yield (based on the thiophosphoryl chloride)=86.

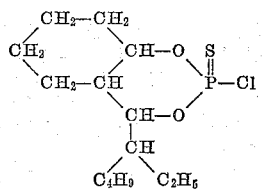

Example 17

Following the general procedure described in Example 15 the dropwise addition to 46 grams (0.3 mol) of phosphoryl chloride during 10 minutes of a solution of 60 grams (0.3 mol) of 4-(tert-butyl)-2-(1-hydroxyethyl)cyclohexanol and 40 grams of benzene yielded a product that, after stripping to a final temperature of 50° C. under less than 2 mm. of mercury, yielded 8-(tert-butyl)-P-chloro-2,4-dioxa-5-methyl-P-oxo-3-phosphabicyclo[4.4.0]decane as an orange viscous liquid having the following properties: equivalent weight (by saponification)=138.1 (theory=140.4); $n_D^{30}=1.4848$. It had the following analysis in percent by weight: P=10.25; Cl=12.62; C=51.64; H=7.93.

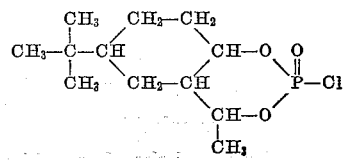

Example 18

To an agitated suspension of 33.5 grams (0.15 mol) of phosphorus pentasulfide in 150 cc. of toluene held at 70° C. there were added dropwise during 15 minutes a solution consisting of 68 grams (0.3 mol) of 2-(2-ethyl-1-hydroxyhexyl)cyclohexanol and 25 cc. of toluene. After heating at 70° C. for 2 additional hours when evolution of gas had ceased, the mixture was allowed to stand overnight at 25° C., filtered, and the filtrate was stripped by distillation to a kettle temperature of 100° C. under less than 2 mm. of mercury. There was thus secured 2,4-dioxa-5-(1-ethylamyl)-P-mercapto-P-thiono-3-phosphabicyclo[4.4.0]decane as a brown viscous liquid having $n_D^{30}=1.5457$, and the following analysis, in percent by weight: P=9.28; S=17.90; C=52.63; H=8.27.

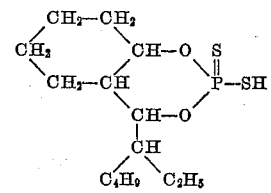

This application is a continuation-in-part of my pending application Serial No. 442,174, filed July 8, 1954. It also is a continuation-in-part of my pending application Serial No. 481,496, filed January 12, 1955.

The invention is susceptible of modification within the scope of the appended claims.

I claim:

1. As new compounds, bicyclo heterocyclic phosphorus compounds having structures corresponding to the formula:

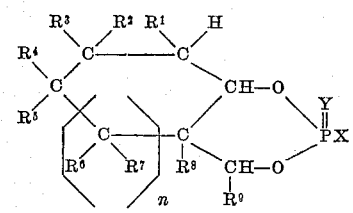

wherein $R^2$, $R^3$, $R^5$, $R^6$, $R^7$ and $R^8$, respectively, designates a member of the class consisting of hydrogen and the methyl radical; $R^1$, $R^4$ and $R^9$, respectively, designates a member of the class consisting of hydrogen and the alkyl radicals having 1 to 20 carbon atoms; X is a radical of the class consisting of chlorine, bromine, fluorine and mercapto radicals; Y is a member of the class consisting of oxygen and sulfur; and n is of the class consisting of 0 and 1.

2. As new compounds, bicyclo heterocyclic phosphorus compounds having structures corresponding to the formula:

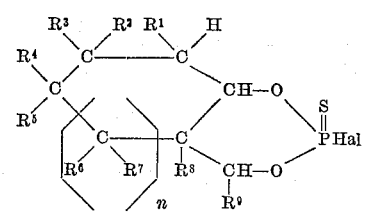

wherein $R^2$, $R^3$, $R^5$, $R^6$, $R^7$ and $R^8$, respectively, designates a member of the class consisting of hydrogen and the methyl radical; $R^1$, $R^4$ and $R^9$, respectively, designates a member of the class consisting of hydrogen and the alkyl radicals having one to twenty carbon atoms; Hal designates a halogen exclusive of iodine; and n is of the class consisting of 0 and 1.

3. As new compounds, bicyclo heterocyclic phosphorus compounds having structures corresponding to the formula:

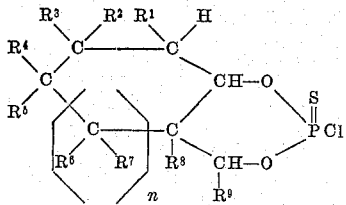

wherein $R^2$, $R^3$, $R^5$, $R^6$, $R^7$ and $R^8$, respectively, designates a member of the class consisting of hydrogen and the methyl radical; $R^1$, $R^4$ and $R^9$, respectively, designates a member of the class consisting of hydrogen and the alkyl radicals having one to twenty carbon atoms; and $n$ is of the class consisting of 0 and 1.

4. As new compounds, bicyclo heterocyclic phosphorus compounds having structures corresponding to the formula:

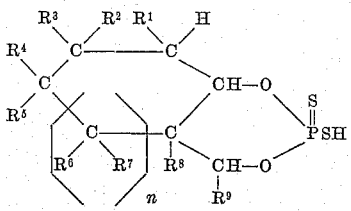

wherein $R^2$, $R^3$, $R^5$, $R^6$, $R^7$ and $R^8$, respectively, designates a member of the class consisting of hydrogen and and methyl radical; $R^1$, $R^4$ and $R^9$, respectively, designates a member of the class consisting of hydrogen and the alkyl radicals having one to twenty carbon atoms; and $n$ is of the class consisting of 0 and 1.

5. As new compounds, bicyclo heterocyclic phosphorus compounds having structures corresponding to the formula:

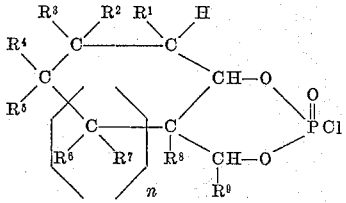

wherein $R^2$, $R^3$, $R^5$, $R^6$, $R^7$ and $R^8$, respectively, designates a member of the class consisting of hydrogen and the methyl radical; $R^1$, $R^4$ and $R^9$, respectively, designates a member of the class consisting of hydrogen and the alkyl radicals having one to twenty carbon atoms; and $n$ is of the class consisting of 0 and 1.

6. As a new compound, P-chloro-2,4-dioxa-5-methyl-P-thiono-3-phosphabicyclo[4.4.0]decane.

7. As a new compound, 2,4-dioxa-P-mercapto-5-methyl-P-thiono-3-phosphabicyclo[4.4.0]decane.

8. As a new compound, P-chloro-2,4-dioxa-5-methyl-P-oxo-3-phosphabicyclo[4.4.0]decane.

9. As new compounds, bicyclo heterocyclic phosphorus compounds having structures corresponding to the formula:

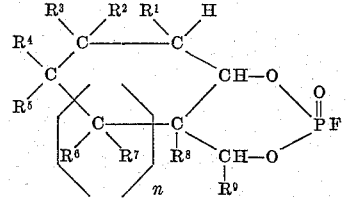

wherein $R^2$, $R^3$, $R^5$, $R^6$, $R^7$ and $R^8$, respectively, designates a member of the class consisting of hydrogen and the methyl radical; $R^1$, $R^4$ and $R^9$, respectively, designates a member of the class consisting of hydrogen and the alkyl radicals having one to twenty carbon atoms; and $n$ is of the class consisting of 0 and 1.

10. As new compounds, bicyclo heterocyclic phosphorus compounds having structures corresponding to the formula:

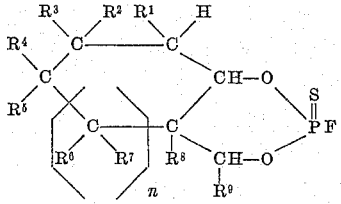

wherein $R^2$, $R^3$, $R^5$, $R^6$, $R^7$ and $R^8$, respectively, designates a member of the class consisting of hydrogen the methyl radical; $R^1$, $R^4$ and $R^9$, respectively, designates a member of the class consisting of hydrogen and the alkyl radicals having one to twenty carbon atoms; and $n$ is of the class consisting of 0 and 1.

11. Process for making bicyclo heterocyclic phosphorus compounds, which comprises reacting at temperatures within the range from 10° C. to 125° C. phosphorus penta-sulfide with a diol of the class consisting of the 2-(1-hydroxyalkyl)cycloalkanols having structures corresponding to the formula:

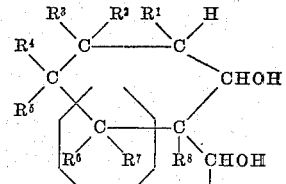

wherein $R^2$, $R^3$, $R^5$, $R^6$, $R^7$ and $R^8$, respectively, designates a member of the class consisting of hydrogen and the methyl radical; $R^1$, $R^4$ and $R^9$, respectively, designates a member of the class consisting of hydrogen and the alkyl radicals having one to twenty carbon atoms; and $n$ is of the class consisting of 0 and 1, and separately recovering from the resultant reaction mixture the bicyclo heterocyclic phosphorus compound thus produced.

12. Process for making bicyclo heterocyclic phosphoryl fluorides, which comprises reacting at temperatures within the range from 25° C. to 200° C. a fluoride of the class consisting of the alkali metal fluorides and ammonium fluoride with a phosphorus-containing compound of the structure

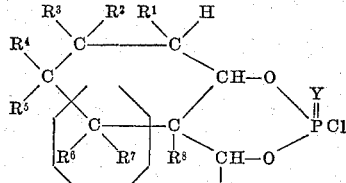

wherein $R^2$, $R^3$, $R^5$, $R^6$, $R^7$ and $R^8$, respectively, represents a radical of the class consisting of hydrogen and the methyl radical; and $R^1$, $R^4$ and $R^9$, respectively, represents a radical of the class consisting of hydrogen and the alkyl radicals having 1 to 20 carbon atoms, Y represents a member of the class consisting of oxygen and sulfur, and $n$ is of the class consisting of 0 and 1, and separately recovering from the resultant reaction mixture the bicyclo heterocyclic phosphoryl fluoride thus produced.

References Cited in the file of this patent

UNITED STATES PATENTS 2,661,365   Gamrath et al. _____ Dec. 1, 1953

OTHER REFERENCES

Gault et al.: "Chem. Abst.," vol. 33, col. 147–8 (1939).